(12) United States Patent
Kim et al.

(10) Patent No.: US 8,072,673 B2
(45) Date of Patent: Dec. 6, 2011

(54) DISPLAY APPARATUS AND METHOD OF MANUFACTURING THE SAME

(75) Inventors: Jong-Seong Kim, Seoul (KR); Neerja Saran, Suwon-si (KR); Woo-Jae Lee, Yongin-si (KR); Myeong-Hee Kim, Mungyeong-si (KR); Seong-Sik Shin, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 12/272,704

(22) Filed: Nov. 17, 2008

(65) Prior Publication Data
US 2009/0231675 A1    Sep. 17, 2009

(30) Foreign Application Priority Data
Dec. 14, 2007    (KR) .......................... 10-2007-130878

(51) Int. Cl.
*G02B 26/00*    (2006.01)
*C04B 41/50*    (2006.01)

(52) U.S. Cl. ..................................... 359/296; 106/287.1

(58) Field of Classification Search .................. 359/296; 345/107; 430/32; 204/600; 106/287.1
See application file for complete search history.

(56) References Cited

U.S. PATENT DOCUMENTS
7,160,587 B2 *    1/2007    Doi .................................. 428/1.6
2009/0296219 A1 *    12/2009    Chang et al. .................. 359/586

FOREIGN PATENT DOCUMENTS
| JP | 8-99327 | 4/1996 |
| JP | 2004-345333 | 12/2004 |
| KR | 2004-0047998 | 6/2004 |
| KR | 2007-0027348 | 3/2007 |

* cited by examiner

*Primary Examiner* — William C Choi
(74) *Attorney, Agent, or Firm* — Innovation Counsel LLP

(57) ABSTRACT

A display apparatus according to an embodiment includes a first substrate including a plastic material, a second substrate facing the first substrate, and a coating layer formed on at least one surface of the first substrate. The coating layer includes a first compound having an acryl-based monomer and a second compound having a silicon derivative, and prevents reflection of light from the first substrate when light is provided to the first substrate. Thus, the display apparatus may have enhanced lightness (brightness) thereby improving the display quality.

20 Claims, 7 Drawing Sheets

Legend:
- Base Substrate
- Common Electrode
- Coating Layer
- Barrier Layer
- Intermediate Layer

| Examples | Structure of opposite substrate | Reflectivity (%) | Examples | Structure of opposite substrate | Reflectivity (%) |
|---|---|---|---|---|---|
| 1 |  | 38.8 | 15 |  | 30.0 |
| 2 |  | 41.3 | 16 |  | 33.1 |
| 3 |  | 27.2 | 17 |  | 31.3 |
| 4 |  | 35.9 | 18 |  | 27.4 |
| 5 |  | 30.8 | 19 |  | 27.2 |
| 6 |  | 30.7 | 20 |  | 27.2 |
| 7 |  | 38.2 | 21 |  | 31.4 |
| 8 |  | 38.5 | 22 |  | 32.0 |
| 9 |  | 31.3 | 23 |  | 29.0 |
| 10 |  | 30.3 | 24 |  | 30.9 |
| 11 |  | 28.3 | 25 |  | 32.7 |
| 12 |  | 37.6 | 26 |  | 33.8 |
| 13 |  | 32.8 | 27 |  | 34.6 |
| 14 |  | 29.3 | 28 |  | 30.8 |

DISPLAY APPARATUS AND METHOD OF MANUFACTURING THE SAME

CROSS-REFERENCE TO RELATED APPLICATION

This application relies for priority upon and claims benefit from Korean Patent Application No. 2007-130878 filed on Dec. 14, 2007, the contents of which are herein incorporated by reference in their entirety.

BACKGROUND

1. Technical Field

Embodiments of the present invention generally relate to a display apparatus and a method of manufacturing the same. More particularly, embodiments of the present invention relate to a display apparatus having improved display quality and a method of manufacturing the display apparatus.

2. Description of the Related Art

In general, a display apparatus displays an image using data processed by an information processing device. The display apparatus may be classified into a liquid crystal display or an electrophoretic display according to a display unit used for displaying the image. For instance, the liquid crystal display displays the image using a liquid crystal layer interposed between two transparent substrates, and the electrophoretic display displays the image using an electrophoretic layer interposed between two transparent substrates.

The electrophoretic display includes upper and lower substrates facing each other, upper and lower electrodes arranged on the upper and lower substrates, respectively, and an electrophoretic layer interposed between the upper and lower electrodes that includes first charge particles and second charge particles. The first charge particles are electrified to have a polarity different from a polarity of the second charge particles. Also, the first charge particles have a color different from that of the second charge particles.

When voltages are respectively applied to the upper and lower electrodes to generate an electric field between the upper and lower electrodes, one of the first and second charge particles becomes positioned at an upper portion between the upper and lower electrodes. As a result, when an external light is reflected by the first charge particles, a user recognizes a color corresponding to the first charge particles. Similarly, when the external light is reflected by the second charge particles, the user recognizes a color corresponding to the second charge particles.

However, when the electrophoretic display displays an image using the external light, the image is displayed darker than the image that is displayed on a display apparatus to which a separate light source is applied.

SUMMARY

Embodiments of the present invention provide a display apparatus having improved display quality. Embodiments of the present invention also provide a method of manufacturing the display apparatus.

In one embodiment of the present invention, a display apparatus includes a first substrate including a plastic material, a second substrate facing the first substrate, and a coating layer formed on at least one surface of the first substrate. The coating layer includes a first compound including an acryl-based monomer and a second compound including a silicon derivative to prevent external light applied to the first substrate from being reflected from the first substrate.

In another embodiment of the present invention, a method of manufacturing a display apparatus is provided as follows. When a first substrate including a plastic material is prepared, a coating layer is formed on at least one surface of the first substrate. The first substrate is combined with a second substrate. The coating layer is formed by mixing a first compound including an acryl-based monomer with a second compound including a silicon derivative to form a coating solution and providing (applying) the coating solution to at least one surface of the first substrate.

According to the above, the coating layer is formed on at least one surface of the first substrate to prevent reflection from the first substrate of the light passing through the first substrate. Thus, the display apparatus may efficiently use the external light needed to display the image, thereby enhancing the lightness (brightness) and improving the display quality of the display apparatus.

BRIEF DESCRIPTION OF THE DRAWINGS

The above and/or other embodiments of the present invention will become readily apparent by reference to the following detailed description when considered in conjunction with the accompanying drawings wherein.

DETAILED DESCRIPTION

Figure 1:
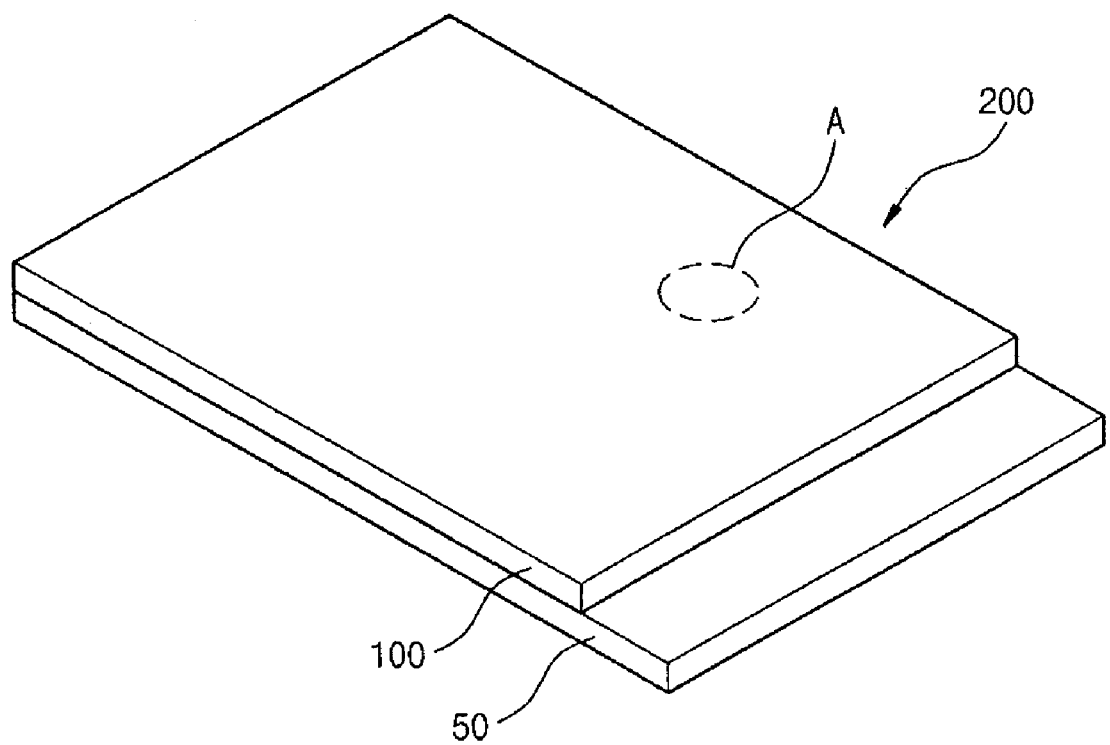
FIG. 1 is a perspective view showing an exemplary embodiment of an electrophoretic display according to the present invention.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer and/or section from another element, component, region, layer and/or section. Thus, a first element, component, region, layer and/or section discussed below could be termed a second element, component, region, layer and/or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees, for example, or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present invention will be explained in detail with reference to the accompanying drawings.

Figure 2:
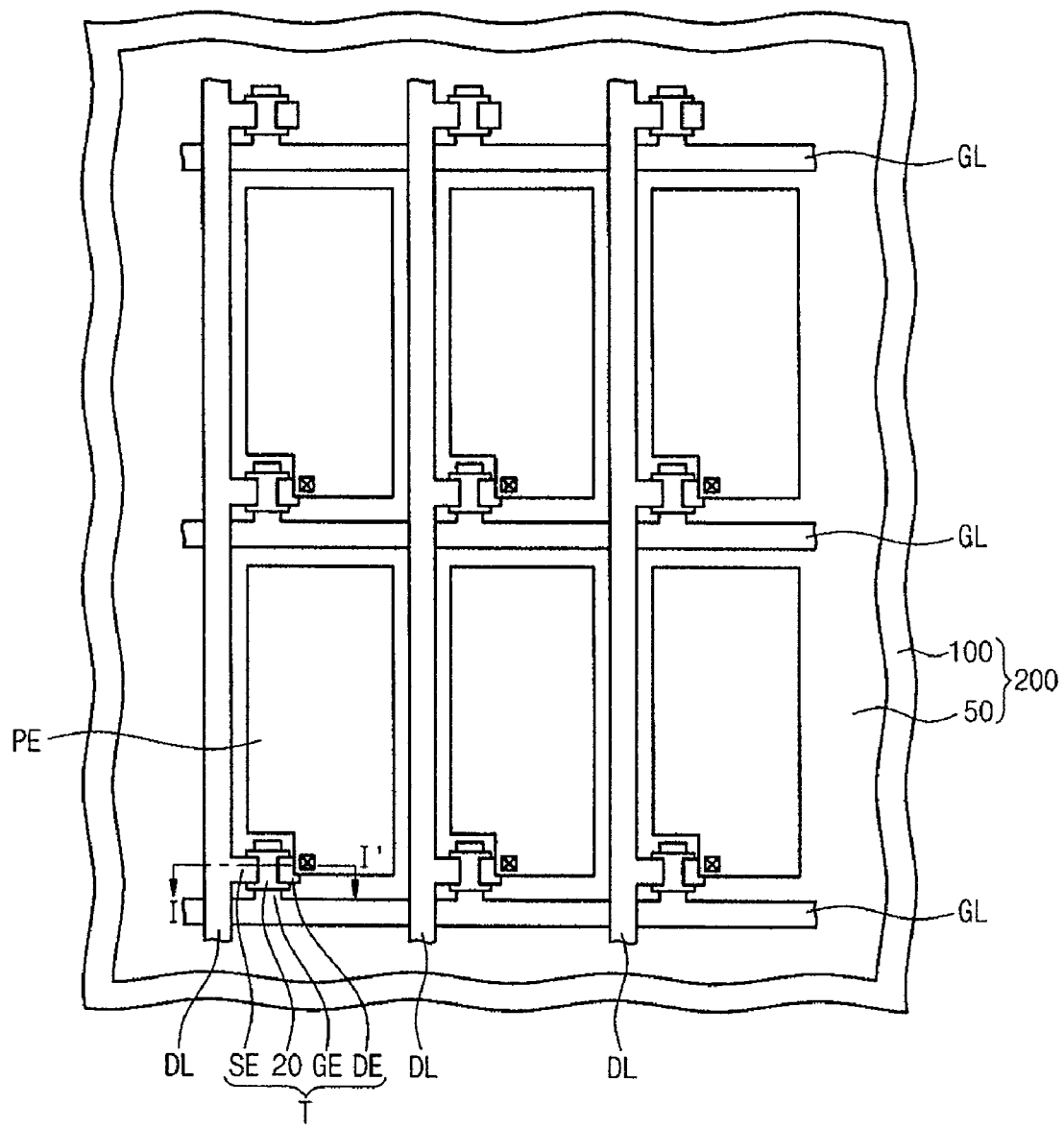
FIG. 2 is an enlarged plan view of a portion "A" of FIG. 1.

FIG. 1 is a perspective view showing an exemplary embodiment of an electrophoretic display according to the present invention, and FIG. 2 is an enlarged plan view of a portion "A" of FIG. 1.

Referring to FIGS. 1 and 2, an electrophoretic display 200 includes an array substrate 50, an opposite substrate 100 facing the array substrate 50, and electrophoretic capsules (not shown in FIG. 1) interposed between the array substrate 50 and the opposite substrate 100.

The electrophoretic display 200 serves as a reflective-type display apparatus and displays an image using an external light. In particular, the electrophoretic display 200 displays the image using light that passes through the opposite substrate 100 and exits through the opposite substrate 100 toward the exterior after being reflected from the electrophoretic capsules.

Data lines DL and gate lines GL are formed on the array substrate 50 and cross each other to define pixel areas on the array substrate 50. Pixel electrodes PE are arranged in the pixel areas, respectively.

Thin film transistors T are arranged in the pixel areas, respectively, and electrically connected to the pixel electrodes PE, respectively. Each of the thin film transistors T includes a gate electrode GE, a source electrode SE, a drain electrode DE, and an active pattern 20. The gate electrode GE is branched from a corresponding gate line of the gate lines GL, and the source electrode SE is branched from a corresponding data line of the data lines DL. The drain electrode DE includes a material that is the same as that of the source electrode SE, and is spaced apart from the source electrode SE. The active pattern 20 is arranged under the source electrode SE and the drain electrode DE and is electrically connected to the source electrode SE and the drain electrode DE.

When the thin film transistor T is turned on in response to a gate signal input through the gate line GL and the gate electrode GE thereof, a data signal transmitted through the data line DL is applied to the pixel electrode PE through the source electrode SE, the active pattern 20, and the drain electrode DE.

In the present exemplary embodiment, the array substrate 50 and the opposite substrate 100 include a plastic material. Thus, the electrophoretic display 200 may be flexibly bent without being damaged by external impacts.

Figure 3:
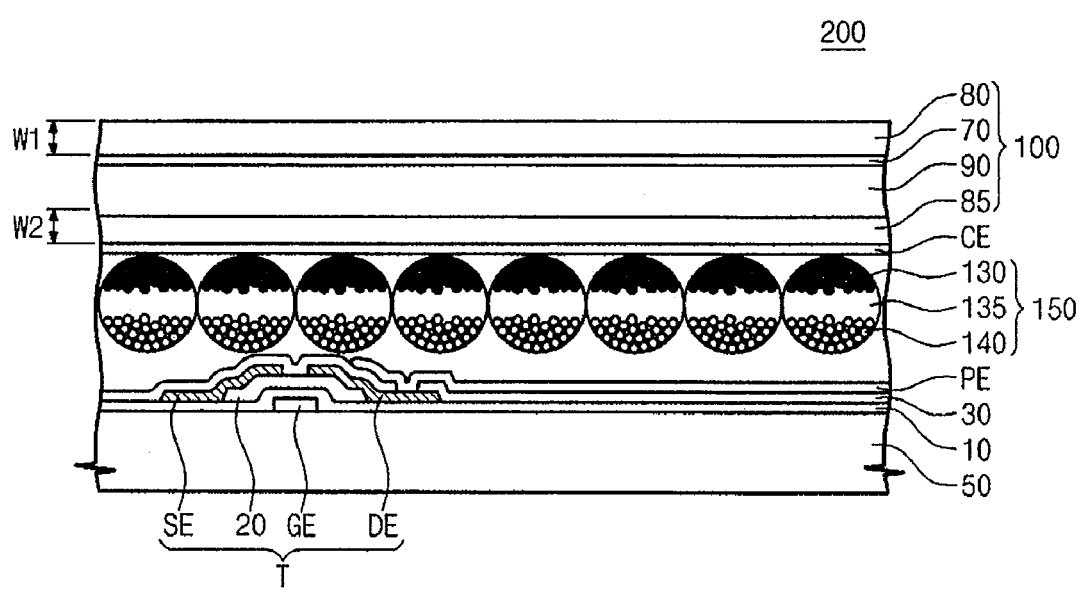
FIG. 3 is a cross-sectional view taken along a line I-I' of FIG. 2.

FIG. 3 is a cross-sectional view taken along a line I-I' of FIG. 2.

Referring to FIG. 3, the opposite substrate 100 facing the array substrate 50 includes a base substrate 90, a first coating layer 80, a second coating layer 85, an intermediate layer 70, and a common electrode CE. The base substrate 90 includes a plastic material. In particular, the base substrate 90 may include polyethyleneterephthalate (hereinafter, referred to as PEN) or polyethersulfone (hereinafter, referred to as PES).

Although in the present exemplary embodiment the base substrate 90 may include PEN or PES, it will be appreciated that the base substrate 90 may include various other plastic materials having a glass transition temperature from about 120 degrees Celsius to about 300 degrees Celsius. If the base substrate 90 includes PEN or PES, the base substrate 90 may have a refractive index of about 1.7.

The intermediate layer 70 is interposed between the base substrate 90 and the first coating layer 80. The intermediate layer 70 is formed on the base substrate 90 for various purposes. For instance, when plural base substrates are manufactured or stored in a stack on top of each other, having the intermediate layer 70 may prevent the base substrates from being bonded to each other. Also, the intermediate layer 70 may improve adhesive properties between the first coating layer 80 and the base substrate 90.

Although in the present exemplary embodiment the intermediate layer 70 is formed on only one surface of the base substrate 90, it will be appreciated that the intermediate layer 70 may also be formed on both surfaces of the base substrate 90, or it may not be formed at all. Furthermore, according to an embodiment, if the intermediate layer 70 is formed on only one surface of the base substrate 90, the intermediate layer 70 may be positioned between the base substrate 90 and the second coating layer 85.

The first coating layer 80 and the second coating layer 85 may be formed on both surfaces of the base substrate 90, respectively. Particularly, the first coating layer 80 may face the base substrate 90 with the intermediate layer 70 being interposed therebetween, and the second coating layer 85 may be positioned between the base substrate 90 and the common electrode CE.

The first coating layer 80 includes a first compound, and the second coating layer 85 includes a second compound. The first compound may contain an acryl-based monomer, and the second compound may contain a silicon derivative. The first compound may be cured by heat or light, and the second compound may induce a sol-gel reaction through a hydrolysis reaction. Thus, when water is added into a mixture of the first and second compounds, the hydrolysis reaction occurs in the mixture, thereby forming a solution of a sol-state. When the solution of the sol-state is matured for a predetermined time, a material of a gel-state may be formed. The material of the gel-state may be vulnerable to external impacts, but the first compound may prevent the material of the gel-state from being damaged by the external impacts.

In the present exemplary embodiment, the first compound may include a compound represented by the chemical formula $CH_3CH(CH_3)COOH$, and the second compound may include tetraethoxyorthosilicate, tetramethoxyorthosilicate, or methylsilsesquioxane.

The first coating layer 80 may be arranged at an outermost position of the opposite substrate 100 to protect the base substrate 90 from being damaged. If the base substrate 90 is exposed to the exterior, defects (e.g., scratches) may occur on the base substrate 90. Thus, the first coating layer 80 covers the base substrate 90 to prevent occurrence of the defects on the base substrate 90.

The second coating layer 85 may prevent the base substrate 90 from being bent because of external temperature variation. The base substrate 90 has a heat expansivity different from a heat expansivity of the first coating layer 80. Accordingly, if only the first coating layer 80 is formed on a surface of the base substrate 90, the base substrate 90 may be bent by the difference of heat expansivity between the first coating layer 80 and the base substrate 90. However, when the first and second coating layers 80 and 85 are formed on both surfaces of the base substrate 90, respectively, the base substrate 90 may be prevented from being bent because the first and second coating layers 80 and 85 have the same heat expansivity, which may support both surfaces of the base substrate 90.

The first coating layer 80 may have a first thickness W1 equal to or smaller than about 5 micrometers, and the second coating layer 85 may have a second thickness W2 equal to or smaller than about 5 micrometers. In the present exemplary embodiment, the first thickness W1 of the first coating layer 80 may be about 0.1 micrometers, and the second thickness W2 of the second coating layer 85 may be about 2 micrometers.

The first and second thicknesses W1 and W2 of the first and second coating layers 80 and 85 may be determined according to a desired flexibility of the electrophoretic display 200. That is, when the first and second thicknesses W1 and W2 of the first and second coating layers 80 and 85 are above a specified value, the first and second coating layers 80 and 85 may be easily cracked while bending the electrophoretic display 200. In other words, as the thickness of the first and second coating layers 80 and 85 is increased, the flexibility of the electrophoretic display 200 is decreased.

Thus, when the first thickness W1 of the first coating layer 80 and the second thickness W2 of the second coating layer 85 are about 0.1 micrometers and about 2 micrometers, respectively, the first and second coating layers 80 and 85 may be prevented from being cracked and may also prevent the base substrate 90 from being damaged. The common electrode CE may include a transparent conductive layer such as indium tin oxide (ITO) or indium zinc oxide (IZO). The common electrode CE is formed over the second coating layer 85 and generates an electric field with the pixel electrode PE arranged on the array substrate 50.

Furthermore, the electrophoretic capsules 150 are interposed between the array substrate 50 and the opposite substrate 100. Each of the electrophoretic capsules 150 includes first particles 140 electrified with a positive polarity, second particles 130 electrified with a negative polarity, and an insulating material 135. The first particles 140 may include titanium dioxide ($TiO_2$) and may have a white color, and the second particles 130 may include carbon black and may have a black color.

When the electric field is not generated between the pixel electrode PE and the common electrode CE, the first particles 140 and the second particles 130 are chaotically arranged in the electrophoretic capsules 150. However, when the electric field is generated between the pixel electrode PE and the common electrode CE, the first particles 140 and the second particles 130 may be rearranged according to directions of the electric field.

For instance, when the electric field is generated by a voltage difference between the pixel electrode PE having a negative polarity and the common electrode CE having a positive polarity, the first particles 140 may be arranged adjacent to the pixel electrode PE in the electrophoretic capsules 150 and the second particles 130 may be arranged adjacent to the common electrode CE in the electrophoretic capsules 150. Thus, when the external light is reflected from the electrophoretic capsules 150 after passing through the opposite substrate 100, a user may recognize the black color of the second particles 130.

At the same time, the lightness (brightness) of the electrophoretic display 200 may be improved as the amount of light reflecting from the electrophoretic capsules 150 and exiting through the opposite substrate 100 toward the exterior increases. The lightness (brightness) is determined according to the efficiency of the external light used to display the image.

Figure 4:
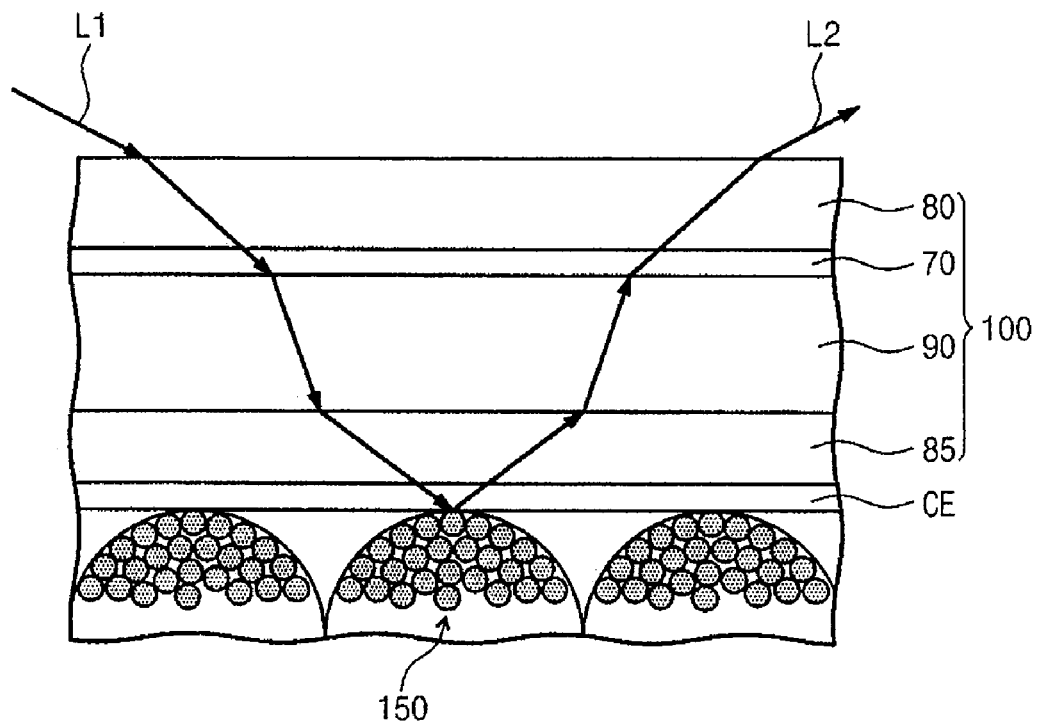
FIG. 4 is a sectional view illustrating a path of light passing through an opposite substrate of FIG. 3.

Hereinafter, the lightness (brightness) of the electrophoretic display 200 will be described in detail with reference to FIGS. 4 and 5. FIG. 4 is a sectional view illustrating a path of light passing through an opposite substrate of FIG. 3.

Referring to FIG. 4, the external light is refracted by the first coating layer 80 and advances toward the base substrate 90. Also, the light is refracted by the second coating layer 85 and advances toward the electrophoretic capsules 150. The light is then reflected from the electrophoretic capsules 150 and exits through the second coating layer 85, the base substrate 90, and the first coating layer 80.

As described above, the lightness (brightness) of the electrophoretic display 200 (shown in FIG. 3) may be determined according to the efficiency of the light used to display the image. The efficiency of the light may be defined as reflectivity. The reflectivity may be obtained from an amount of light L1 incident into the electrophoretic display 200 from the exterior and an amount of light L2 emitting from the electrophoretic display 200 after reflecting from the electrophoretic capsules 150. As the difference between the amounts of incident light L1 and emitting light L2 decreases, the reflectivity increases, thereby enhancing the lightness (brightness) of the electrophoretic display.

In the present exemplary embodiment, the first coating layer 80 has a refractive index smaller than a refractive index of the base substrate 90. Particularly, the base substrate 90 may have a refractive index of about 1.7, and the first coating layer 80 may have a refractive index of about 1.0 to about 1.6.

When light passes through the first coating layer 80 and advances toward the base substrate 90, the light is not total-reflected from the base substrate 80 since the refractive index of the base substrate 90 is greater than the refractive index of the first coating layer 80, thereby increasing the reflectivity.

As shown in FIG. 4, when the opposite substrate 100 includes the first coating layer 80, the intermediate layer 70, the base substrate 90, and the second coating layer 85 sequentially stacked on the opposite substrate 100, the electrophoretic display 200 may have a reflectivity of about 39.4%. Also, according to an embodiment, if the intermediate layer 70 is positioned between the base substrate 90 and the second coating layer 85, the electrophoretic display 200 may have a reflectivity of about 39.3%.

Figure 5:
FIG. 5 is a table illustrating reflectivities of various electrophoretic displays.
Figure 5:
Figure 5:
Figure 5:
Figure 5:
Figure 5:
Figure 5:
Figure 5:
Figure 5:
Figure 5:
Figure 5:
Figure 5:
Figure 5:
Figure 5:
Figure 5:
Figure 5:
Figure 5:
Figure 5:
Figure 5:
Figure 5:
Figure 5:
Figure 5:
Figure 5:
Figure 5:
Figure 5:
Figure 5:
Figure 5:
Figure 5:

FIG. 5 is a table illustrating reflectivities of various electrophoretic displays. In FIG. 5, reflectivities of various electrophoretic displays are listed according to the structure of the opposite substrate 100.

In examples 1 to 28 shown in FIG. 5, each of the opposite substrates includes the common electrode and the base substrate as well as at least one of the intermediate layer, a barrier layer, and the coating layer.

In general, the barrier layer may include silicon nitride (SiNx) and may be applied to display devices to prevent occurrence of various defects on the display devices. For instance, the barrier layer may prevent the transfer of humidity from the exterior to the display devices. However, the electrophoretic display 200 including the electrophoretic capsules 150 as described in the above-mentioned embodiments may not be affected by humidity as compared with a liquid crystal display to which a liquid crystal is applied. Accordingly, the barrier layer may be removed (omitted) from the electrophoretic display 200.

Each of the opposite substrates shown in examples 1 to 6 includes the base substrate, the intermediate layer, and the barrier layer. The electrophoretic displays including the opposite substrates shown in examples 1 and 2 have reflectivities of about 38.8% and about 41.3%, respectively. These reflectivities of the electrophoretic displays including the opposite substrates as shown in examples 1 and 2 are equal to or greater than the reflectivity (about 39% to about 40%) of the electrophoretic display described according to the present exemplary embodiment. However, the opposite substrates as shown in examples 1 and 2 do not include the coating layer; therefore, the base substrate is exposed to the exterior of the electrophoretic display, and may thereby be damaged by external impacts.

Also, the electrophoretic displays including the opposite substrates as shown in examples 3 to 6 have reflectivities of about 27% to about 36% that are smaller than the reflectivity (about 39% to about 40%) of the electrophoretic display described according to the present exemplary embodiment. The reason that the reflectivities of the electrophorectic displays including the opposite substrates as shown in examples 3 to 6 are small is that the opposite substrates as shown in examples 3 to 6 include the barrier layer having a refractive index greater than that of the base substrate.

The electrophoretic displays including the opposite substrates as shown in examples 7 and 8 have reflectivities of about 38% to about 39% that are equal to or smaller than the reflectivity (about 39% to about 40%) of the electrophoretic display described according to the present exemplary embodiment. However, since each of the opposite substrates according to examples 7 and 8 includes the coating layer formed only on one surface of the base substrate, the base substrate of each of the opposite substrates may be bent.

The electrophoretic displays including the opposite substrates as shown in examples 9 and 10 have reflectivities of about 30% to about 32% that are remarkably smaller than the reflectivity (about 39% to about 40%) of the electrophoretic display described according to the present exemplary embodiment. Each of the opposite substrates according to examples 9 and 10 includes the barrier layer, which is formed on both surfaces of the base substrate. Since the barrier layer includes a material having a refractive index greater than that of the base substrate, the amount of light total-reflected from the barrier layer increases to thereby reduce the reflectivities of the electrophoretic displays including the opposite substrates as shown in examples 9 and 10.

The electrophoretic displays including the opposite substrates as shown in examples 11 to 28 have reflectivities of about 27% to about 38% that are smaller than the reflectivity (about 39% to about 40%) of the electrophoretic display described according to the present exemplary embodiment. Furthermore, the opposite substrates shown in examples 11 to 28 may have defects such as damaging of the base substrate, bending of the base substrate, etc., so that the opposite substrates shown in examples 11 to 28 may not be applied to the electrophoretic display.

Figure 6:
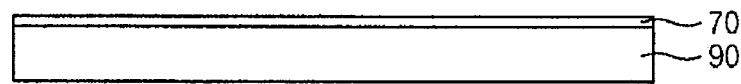
FIGS. 6 to 8 are views illustrating a method of manufacturing an opposite substrate of FIG. 3.
Figure 7:
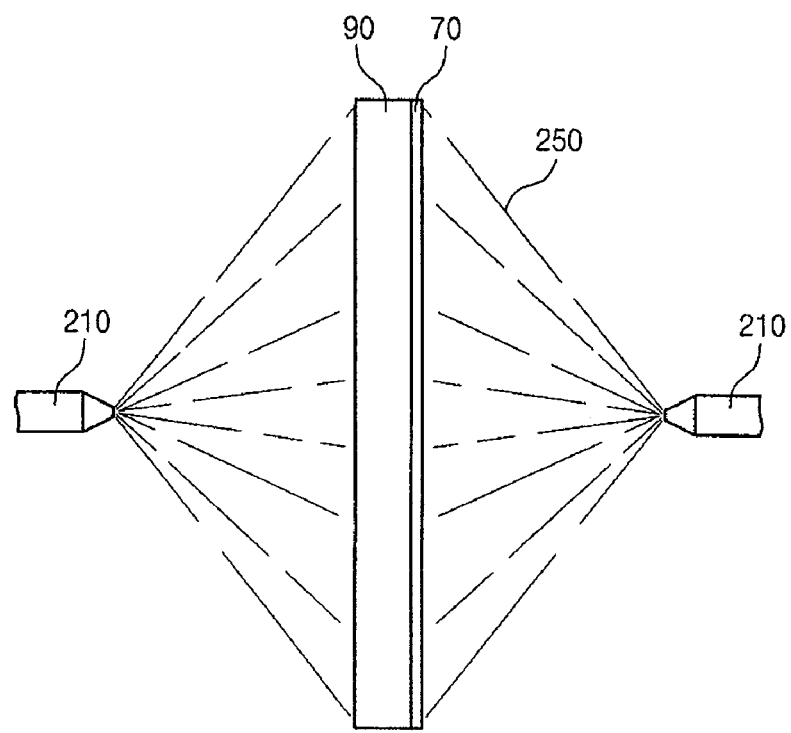
Figure 8:
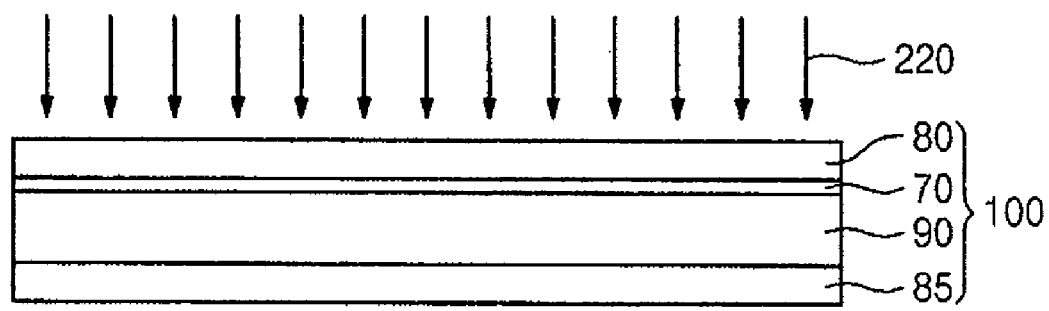

FIGS. 6 to 8 are views illustrating a method of manufacturing an opposite substrate of FIG. 3. In FIGS. 6 to 8, the same reference numerals denote the same elements in FIGS. 1 to 4, and thus the detailed descriptions of the same elements will be omitted.

Referring to FIGS. 6 to 8, the intermediate layer 70 is formed on the base substrate 90. The intermediate layer 70 has a thickness thinner than the thicknesses of the base substrate 90, the first coating layer 80, and the second coating layer 85.

In the present exemplary embodiment, the intermediate layer 70 is formed on one surface of the base substrate 90. Although not shown in FIGS. 6 to 8, the intermediate layer 70 may be formed on both surfaces of the base substrate 90, or it may not be formed on any of the surfaces of the base substrate 90.

Referring to FIG. 7, a coating solution 250 is sprayed onto the base substrate 90 on which the intermediate layer 70 is formed using a sprayer 210. The coating solution 250 may be a mixture of a first compound containing an acryl-based monomer and a second compound containing a silicon derivative.

In particular, the coating solution 250 may contain about 1 to 99 percent by weight of the second compound with respect to the weight percent of the first compound. In the present exemplary embodiment, the coating solution 250 may contain about 40 to 60 percent by weight of the second compound with respect to the weight percent of the first compound.

In the present exemplary embodiment, the coating solution 250 is provided to the base substrate 90 by the sprayer 210, however, the coating solution 250 may be provided to the base substrate 90 using various methods such as a printing method (e.g. a silk screen method or an offset method), a spin coating method, etc.

Referring to FIG. 8, after spraying the coating solution 250 onto the base substrate 90, light 220 is irradiated onto the coating solution 250, which is provided to the base substrate 90. As a result, the coating solution 250 is cured by light 220 to form the first and second coating layers 80 and 85, thereby completing fabrication of the opposite substrate 100.

According to the above, the coating layer is formed on at least one surface of the base substrate to prevent reflection of light from the base substrate of light that passes through the base substrate. Thus, the electrophoretic display may efficiently use the external light needed to display the image, thereby enhancing lightness (brightness) and improving the display quality of the electrophoretic display.

Although a few exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A display apparatus comprising:
   a first substrate including a plastic material;
   a second substrate facing the first substrate; and
   a coating layer formed on at least one surface of the first substrate, the coating layer comprising:
      a first compound including an acryl-based monomer; and
      a second compound including a silicon derivative to induce a sol-gel reaction with the first compound.

2. The display apparatus of claim 1, wherein the first compound is cured by exposure to light or heat.

3. The display apparatus of claim 1, wherein the plastic material has a glass transition temperature from about 120 degrees Celsius to about 300 degrees Celsius, and the plastic material comprises polyethyleneterephthalate or polyethersulfone.

4. The display apparatus of claim 1, wherein the second compound has a weight percent of about 1 to 99 with respect to the first compound.

5. The display apparatus of claim 4, wherein the second compound has a weight percent of about 40 to 60 with respect to the first compound.

6. The display apparatus of claim 1, wherein the second compound comprises tetraethoxyorthosilicate, tetramethoxyorthosilicate, or methylsilsesquioxane.

7. The display apparatus of claim 1, wherein the coating layer has a thickness equal to or smaller than about 5 micrometers.

8. The display apparatus of claim 1, wherein the coating layer has a refractive index smaller than a refractive index of the first substrate, and the refractive index of the coating layer is from about 1.0 to about 1.6.

9. The display apparatus of claim 1, further comprising an electrophoretic layer interposed between the first substrate and the second substrate.

10. The display apparatus of claim 1, further comprising an intermediate layer interposed between the coating layer and at least one surface of the first substrate.

11. A method of manufacturing a display apparatus, comprising:
preparing a first substrate including a plastic material;
forming a coating layer on at least one surface of the first substrate; and
combining a second substrate with the first substrate,
wherein the forming of the coating layer comprises:
mixing a first compound including an acryl-based monomer with a second compound including a silicon derivative to form a coating solution, and the second compound inducing a sol-gel reaction with the first compound; and
providing the coating solution onto at least one surface of the first substrate.

12. The method of claim 11, wherein the forming of the coating layer further comprises curing the coating solution using light or heat.

13. The method of claim 11, wherein the coating layer comprises about 1 to 99 percent by weight of the second compound with respect to a weight percent of the first compound.

14. The method of claim 13, wherein the coating layer comprises about 40 to 60 percent by weight of the second compound with respect to the weight percent of the first compound.

15. The method of claim 11, wherein the plastic material has a glass transition temperature from about 120 degrees Celsius to about 300 degrees Celsius, and the plastic material comprises polyethyleneterephthalate or polyethersulfone.

16. The method of claim 11, wherein the second compound comprises tetraethoxyorthosilicate, tetramethoxyorthosilicate or methylsilsesquioxane.

17. The method of claim 11, wherein the coating layer has a thickness equal to or smaller than about 5 micrometers.

18. The method of claim 11, wherein the coating layer has a refractive index smaller than a refractive index of the first substrate, and the refractive index of the coating layer is from about 1.0 to about 1.6.

19. The method of claim 11, further comprising forming an electrophoretic layer between the first substrate and the second substrate.

20. The method of claim 11, further comprising forming an intermediate layer between the coating layer and the at least one surface of the first substrate.

* * * * *